United States Patent

[11] 3,607,497

| [72] | Inventor | Dennis S. Chrobak<br>Akron, Ohio |
|---|---|---|
| [21] | Appl. No. | 837,795 |
| [22] | Filed | June 30, 1969 |
| [45] | Patented | Sept. 21, 1971 |
| [73] | Assignee | The Goodyear Tire & Rubber Company<br>Akron, Ohio |

[54] TIRE-TREADING METHOD
9 Claims, 6 Drawing Figs.

[52] U.S. Cl. .................................................. 156/95,
156/117
[51] Int. Cl. ..................................... B29h 17/37
[50] Field of Search........................................... 156/117,
124, 95, 12 B, 397

[56] References Cited
UNITED STATES PATENTS

| 951,872 | 3/1910 | Wirt | 156/128 |
|---|---|---|---|
| 1,009,366 | 11/1911 | Wirt | 156/124 |
| 2,792,868 | 5/1957 | Benson | 156/124 |
| 3,177,918 | 4/1965 | Holman | 156/128 |
| 3,433,689 | 3/1969 | Marzocchi | 156/117 |

*Primary Examiner*—Benjamin A. Borchelt
*Assistant Examiner*—David Bent
*Attorneys*—F. W. Brunner and Michael L. Gill ABSTRACT: A method of applying a cord-reinforced tread to a tire carcass in which; a ribbon of uncured rubber stock is formed, cord reinforcing is applied longitudinally to the ribbon, and the ribbon and cord are wound about the circumference of the tire in a plurality of turns to form the tread.

The foregoing abstract is not to be taken as limiting the invention of this application, and in order to understand the full nature and extent of the technical disclosure of this application, reference must be made to the accompanying drawings and the following detailed description.

INVENTOR.
DENNIS S. CHROBAK
BY Michael L. Gill
ATTORNEY

PATENTED SEP 21 1971 3,607,497

INVENTOR.
DENNIS S. CHROBAK
BY Michael L. Gill
ATTORNEY

TIRE-TREADING METHOD

This invention relates to pneumatic tires and in particular to a method and apparatus for applying tread material to the carcass of a tire.

In high-speed pneumatic tires such as those used on aircraft centrifugal force, high impact on landing and skidding cause mechanical stresses in the tread portion which can tend to cause chunking or throwing off of portions of the tread. It is often desirable, particularly in high-speed tires, to provide some fiber or fabric reinforcement in the tread or undertread portion of the tire in order to improve the mechanical strength and stability of the tread portion.

In the past, one common method of providing this reinforcement was first to apply one or more layers of undertread rubber to the carcass, then apply one or more plies of fabric reinforcement and finally, apply a last layer or layers of tread stock. This involves at least a three-step operation, considerable manual labor and is expensive from a manufacturing standpoint.

It is an object of this invention to provide a method of applying a cord-reinforced tread portion to a pneumatic tire in a one-step operation. It is a further object to provide a method of applying a cord-reinforced tread portion to a pneumatic tire in a one-step operation in which the cord reinforcement is disposed in the tread at one or more predetermined depths in the tread.

Other objects and advantages of this invention will be apparent from the drawings and the following discussion thereof.

Figure 6:
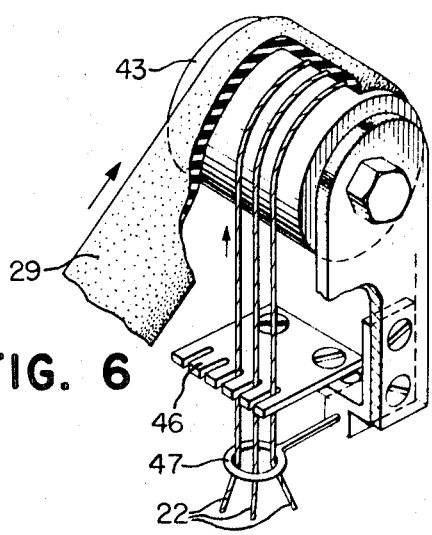
Figure 4:
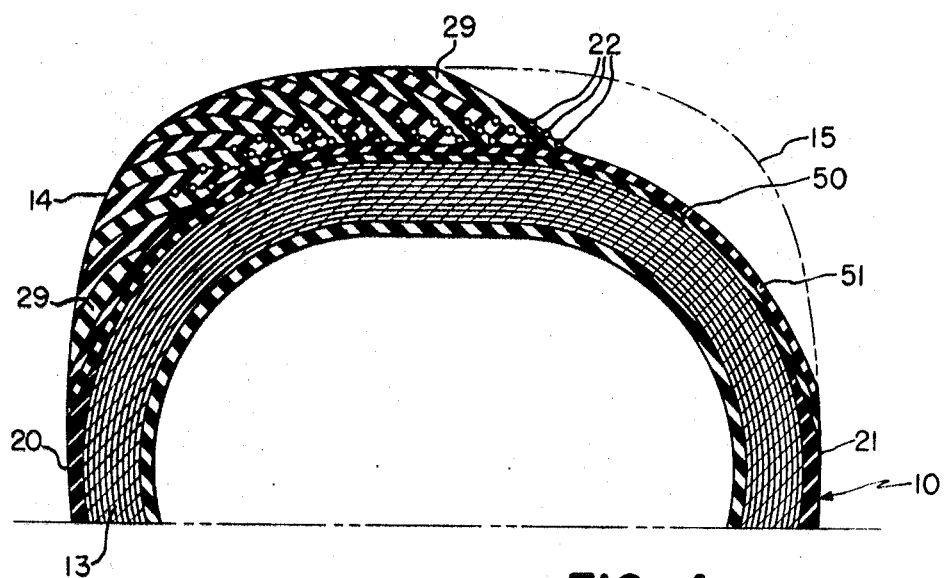
Figure 5:
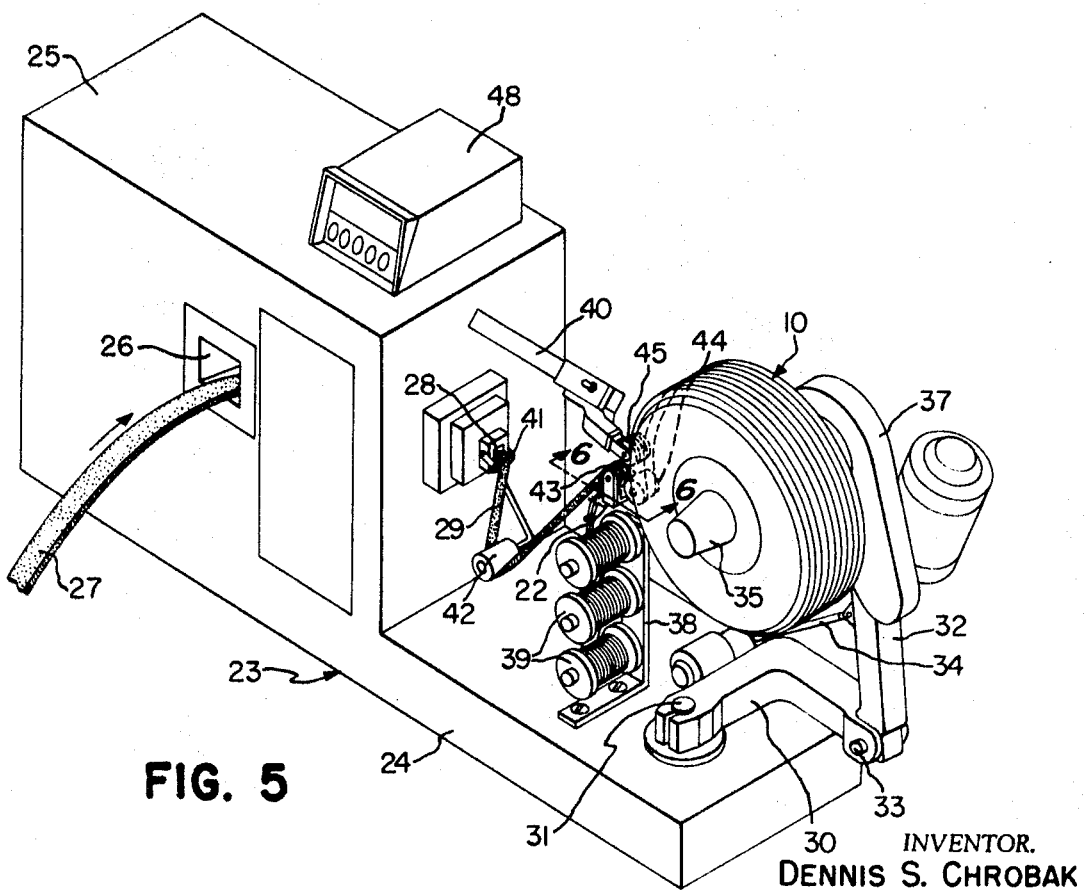

FIG.. 3 is a perspective view of a portion of a further embodiment of tread stock incorporating this invention;

FIG. 4 is a partial, sectional view of a tire carcass which has part of its tread stock applied in accordance with this invention;

FIG. 5 is a perspective view of an apparatus used in carrying out the method of this invention; and FIG. 6 is a perspective view of a portion of the apparatus of FIG. 5 taken substantially along line 6—6 with parts broken away.

Figure 1:
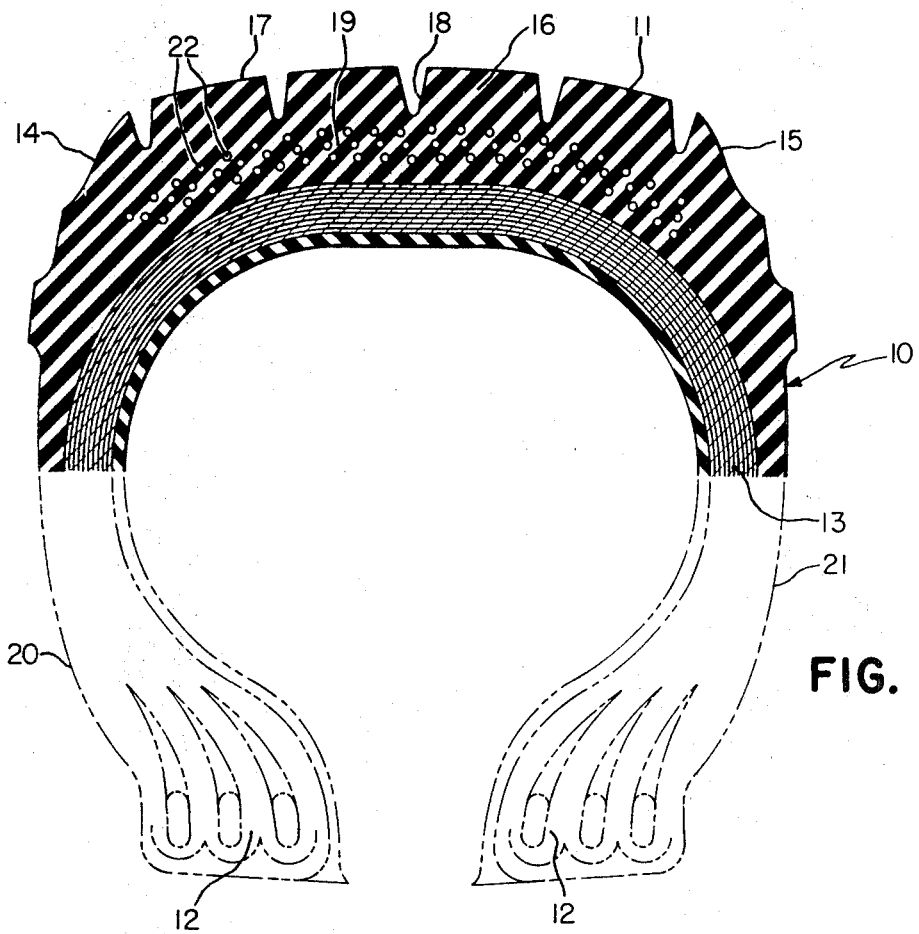
FIG. 1 is a cross-sectional view of a tire, the tread portion of which has been applied in accordance with this invention.

With reference to the drawings and in particular FIG. 1, there is shown a cross-sectional view of a pneumatic tire 10, the tread portion 11 of which has been applied in accordance with the method of this invention. The tire includes a pair of bead members 12 having a carcass 13 extending therebetween. The tread portion 11 is disposed about and overlies the carcass 13 and has a pair of shoulder portions 14 and 15 adjacent its lateral edges. The tread portion 11 comprises a nonskid portion 16 which extends from the tread surface 17 to the bottom of the antiskid grooves 18 and an undertread portion 19 which extends from the bottom of the antiskid grooves 18 to the top of the carcass 13. The sidewalls 20 and 21 extend upward from the beads 12 to the shoulders 14 and 15, respectively. A series of cords 22 applied in accordance with the method of this invention extend generally circumferentially of the tire 10 and in the particular embodiment illustrated, are disposed entirely in the undertread portion 19. The cords 22 may be of any material suitable for use as a tire reinforcement such as, by way of example only, nylon, rayon, polyester, fiberglass or wire.

With reference to FIG. 5, an apparatus which may be utilized in carrying out the method of this invention comprises a partially conventional tire-treading machine 23. The machine comprises a bed plate 24 having an extruder 25 mounted on one end thereof. An input hole 26 for uncured rubber stock 27 is located on the side of the extruder 25 and an extrusion die 28 for dispensing a continuous strip or ribbon 29 of stock is located on the end of of the extruder 25. The stock 27 and hence the ribbon 29 can be natural or synthetic rubber or any other elastomeric material suitable for forming the tread, such materials being well known in the art.

A horizontal base frame 30 is mounted on the opposite end of the bed plate 24 for pivotal movement about a vertical axis on shaft 31 that is generally is line with, but removed from the extrusion die 28. A generally upstanding arm 32 is mounted at its lower end on a horizontal shaft 33 which is carried by the base frame 30 and is disposed eccentrically of the vertical shaft 31 and transverse to the extrusion die 28. A jackscrew drive arrangement 34 is pivotally connected at its opposite ends to the base frame 30 and arm 32 for controlling the pivotal movement of the upstanding arm 32 about the shaft 33. A rotatable spindle 35 for mounting a tire 10 is mounted on the upper end of the arm 32 with its rotational axis extending parallel to the shaft 33. Variable speed drive means 37 for rotating the tire 10 is carried by the arm 32. By rotating the base frame 30 about the vertical shaft 31, the tread area of the tire can be passed transversely across the stitchers 45. The tire can be moved toward and away from the stitchers by rotating the arm 32 about its horizontal shaft 33.

A creel 38 is mounted on the bed plate 24 between the base frame 30 and the extrusion die 28 for carrying one or more bobbins or spools 39 of reinforcing cord.

A series of horizontal parallel rollers 41, 42, 43 and 44 are provided for the purpose of guiding the ribbon of rubber stock 29 from the die 28 to the tire carcass 36. A turndown roll 41 is located just below the outlet of the extrusion die 28. A dancer roll 42 is located below the turndown roll 41 and is capable of sensing the amount of slack in the ribbon or strip 29 between the die 28 and the tire 10. A guide roll 43 is disposed between the tire carcass and the extrusion die 28 and an applicator roll 44 between the guide roll 43 and tire carcass 10. A series of stitchers 45 are located above the applicator roll 44. A horizontal arm 40 is mounted on the extruder 25 generally above the die which extends toward the tire 10 and supports the guide roll 43 and applicator roll 44. A comb or guide 46, best seen in FIG. 6, is disposed between the guide roll 43 and the creel 38 and supported by the arm 40. An eye-type guide 47 extends down from the comb 46 and is located between the comb 46 and the creel 38.

An automatic retreading programmer 48 is mounted on the extruder and controls the movement of the base frame 30, the vertical arm 32 and the rotation of the tire 10. The vertical arm 32 can be pivoted about its axis 33 in either direction to move the tire carcass toward or away from the applicator roll 44 and stitchers 45. The base frame 30 can be turned, as required, about its vertical shaft 31 to cause the tread area of the rotating tire carcass to move laterally across in front of the applicator roll 44. The dancer roll 42 detects any excess slack on the ribbon 29 and sends a signal back to the programmer 48 which in turn speeds up the rotation of the tire 10 and movement of the base frame 30 to take up the slack. Similarly, if there is not enough slack, the programmer slows down movement of the frame 30 and rotation of the tire 10.

In a typical retreading operation, the worn tread of a tire 10, illustrated in FIGS. 4 and 5, is buffed away leaving a thin layer of rubber stock 50 above the carcass 13. A squeegee or base layer of gum stock 51 is normally applied over the buffed surface in any suitable manner. The tire 10 is then mounted on the spindle 35 and inflated. A retreading program is fed into the programmer 48 which controls the profile of the tread by varying the rotation of the frame 30 relative to the rotation of the tire 10 to vary the amount each successive turn of ribbon or stock 29 overlaps the next preceding turn of stock 29. Uncured rubber stock is fed into the hole 26 in the extruder 25 and comes out the die 28 in a ribbon 29 of the desired cross section. The ribbon 29 is fed over the turndown roll 41, under the dancer roll 42, over the guide roll 43 and under the applicator roll 44 to a point on the upper sidewall 20 or shoulder region 14 where it is desired that the building of the tread start. The tire 10 is rotated and the applicator roll 44 and stitchers 45 cause the ribbon to stick to the carcass and be wound about the periphery thereof.

The base frame 30 is rotated slowly to cause the ribbon application point to traverse laterally of the carcass or across the tread area. The speed with which the frame 30 rotates determines how much overlap of the ribbon there will be and, thus, how thick the tread will be. It is this speed that is varied in order to vary the thickness of the tread across the tread profile.

As best seen in FIG. 6, the cord is applied to the ribbon 29 by feeding the cords 22 through the eye 47 and individually through the spaces between the teeth of the comb 46 to the bite between the guide roll 43 and ribbon 29. The uncured ribbon 29 of the robber stock is tacky and picks up the cord and carries it along onto the carcass. The bobbins 39 are free to rotate and provide for application of the cord to the strip in an unstretched state or under as little tension as possible.

Figure 2:
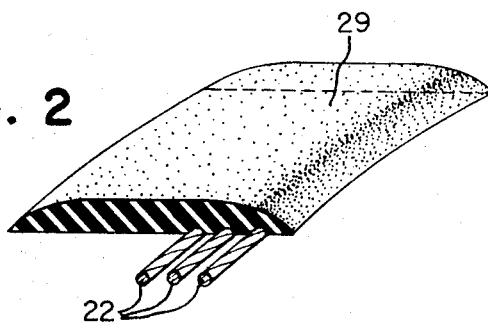
FIG. 2 is a perspective view of a portion of tread stock incorporating this invention.
Figure 3:
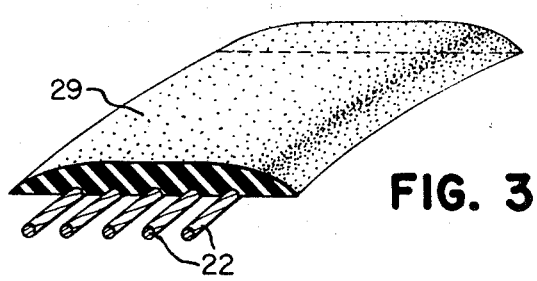

As best seen in FIGS. 2, 3 and 6, the location of the cord 22 laterally of the ribbon 29 can be controlled by adjusting the location of the comb 46 axially relative to the guide roll 43. The number of cords can be increased or decreased and the location of the comb 46 adjusted as desired. For example, as illustrated in FIGS. 2, 4 and 6, if it is desired to have three layers of cord disposed entirely in the undertread, three cords are applied to one side of the ribbon close to a lateral edge thereof. As the ribbon is wrapped about the carcass in overlapping fashion, as illustrated in FIG. 4, the portion of the ribbon 28 carrying the cords 22 will be disposed in the lower portion of the tread, or in the undertread. If it is desired that the cords be located closer together or farther apart the comb 46 can be replaced with one having the desired tooth spacing. When the tire has been placed in a mold and cured, it will appear similar to the tire in FIG. 1 having the cords 22 disposed entirely in the undertread 19. The cure time and temperatures are will within the state of the art and, of course, will depend on such factors as the elastomer used and the thickness of the tread.

It should be noted that although in the specific example illustrated, the cord 22 is applied to the strip 29 before the strip is applied to the carcass, the steps need not necessarily be in that order. For example, the strip could be wound on the carcass and the cord wound on top of the strip at the same time or the cord could be fed through the extrusion die with the rubber. In each case, however, the strip and cord are wound on the carcass simultaneously in a plurality of turns forming a tread that is reinforced with cords that are disposed in predetermined positions in the tread.

It can be readily seen that one or more layers of cord can be applied to the carcass and can be disposed throughout the tread portion or restricted to a given portion in a continuous treading operation. The desired number and specific location of the cords is a design factor dependent upon the desired characteristics of the tire. Also, it will be readily recognized by those skilled in the art that the method of this invention is not limited to retreading but also will find utility in the original manufacture of tires.

While certain representative embodiments and details have been shown for the purposed of illustrating the invention, it will be apparent to those skilled in the art that various changes and modifications may be made therein without departing from the invention.

What is claimed is:

1. In a method of applying a tread to a tire carcass, the improvement comprising applying a strip of elastomeric material that is substantially narrower than the tread and at least one cord simultaneously to the carcass in a plurality of turns around the circumference thereof.

2. The improvement as claimed in claim 1 wherein said strip is applied to the carcass in a plurality of turns about the circumference thereof, and said at least one cord is applied to at least a portion of said strip and longitudinally with respect thereto prior to application of said strip to said carcass.

3. The improvement as claimed in claim 2 wherein said strip is wound onto the carcass by applying the free end of said strip to said carcass, rotating the carcass to wrap the strip around the carcass, and effecting progressive relative movement between the strip and carcass in a direction generally laterally of the carcass.

4. The improvement as claimed in claim 3 wherein said strip is applied in an overlapping manner to the carcass.

5. The improvement as claimed in claim 4 wherein said strip is substantially thinner than it is wide and said cord is applied to said strip in a predetermined position along the width thereof.

6. In a method of retreading a tire the improvement comprising preparing said tire to receive elastomeric material, applying a strip of elastomeric material that is substantially narrower than the tread and at least one cord simultaneously to the carcass in a plurality of turns about the circumference thereof.

7. The improvement as claimed in claim 6 wherein said strip is applied to said carcass in a plurality of turns about the circumference thereof, and said at least one cord is applied to at least a portion of said strip and longitudinally with respect thereto prior to application of the strip to the carcass.

8. The improvement as claimed in claim 7 wherein said strip is wound onto the carcass by applying the free end of said strip to said carcass, rotating said carcass to wrap the strip around the carcass, and effecting progressive relative movement between the strip and carcass in a direction generally laterally of the carcass.

9. The improvement as claimed in claim 8 wherein said strip is substantially thinner than it is wide and said cord is applied to said strip in a predetermined position along the width thereof.